(12) United States Patent
Nowotarski

(10) Patent No.: US 11,441,720 B2
(45) Date of Patent: Sep. 13, 2022

(54) SHOWER HOSE SILENCING PAD APPARATUS

(71) Applicant: Daniel Nowotarski, Grayslake, IL (US)

(72) Inventor: Daniel Nowotarski, Grayslake, IL (US)

( * ) Notice: Subject to any disclaimer, the term of this patent is extended or adjusted under 35 U.S.C. 154(b) by 291 days.

(21) Appl. No.: 16/924,290

(22) Filed: Jul. 9, 2020

(65) Prior Publication Data

US 2022/0010911 A1    Jan. 13, 2022

(51) Int. Cl.
*F16L 55/033* (2006.01)
*F16L 57/00* (2006.01)
*E03C 1/02* (2006.01)

(52) U.S. Cl.
CPC .......... *F16L 55/0335* (2013.01); *E03C 1/025* (2013.01)

(58) Field of Classification Search
CPC . F16L 55/0335; F16L 55/0036; F16L 55/033; F16L 57/02; F16L 57/06; E03C 1/025; E03C 1/021
See application file for complete search history.

(56) References Cited

U.S. PATENT DOCUMENTS

| | | | |
|---|---|---|---|
| 3,920,786 A | 11/1975 | Brunelle | |
| 3,990,535 A * | 11/1976 | Bruce | F16H 59/0208 181/207 |
| 4,205,034 A | 5/1980 | Newberry | |
| 4,218,814 A | 8/1980 | Hodapp | |
| 4,970,351 A * | 11/1990 | Kirlin | H02G 3/0406 174/136 |
| 5,277,227 A | 1/1994 | Bradshaw | |
| 6,156,973 A * | 12/2000 | Ushiyama | H02G 3/0481 174/136 |
| 6,491,067 B1 | 12/2002 | Davenport | |
| 6,774,312 B2 * | 8/2004 | Fatato | F16L 57/00 174/74 A |
| D719,647 S | 12/2014 | Melo | |
| 2019/0285221 A1 | 9/2019 | Carter | |

FOREIGN PATENT DOCUMENTS

| | | | | |
|---|---|---|---|---|
| DE | 102013110274 A1 * | 3/2015 | ............. | F16L 57/00 |
| FR | 2740529 A1 * | 4/1997 | ............. | F16L 11/15 |
| FR | 2886954 A3 * | 12/2006 | ............. | E03C 1/021 |
| FR | 2886955 A3 * | 12/2006 | ............. | E03C 1/021 |
| JP | H1194341 A * | 4/1999 | ............. | F24F 13/02 |
| WO | WO0181815 | 11/2001 | | |

* cited by examiner

*Primary Examiner* — Edgardo San Martin

(57) ABSTRACT

A shower hose silencing pad apparatus for silencing noise of a shower hose against the wall includes at least two segment bodies. Each segment body has a pair of outer edges and a sidewall extending therebetween. The sidewall has an inner face, an outer face, and a channel extending from the outer face through the inner face and between the pair of outer edges. Each segment body attaches to a shower hose. A plurality of dampeners is coupled to the outer face of each segment body. A plurality of connector straps is coupled to the segment bodies. Each connector strap is coupled between the outer edges of adjacent segment bodies of the at least two segment bodies.

10 Claims, 4 Drawing Sheets

SHOWER HOSE SILENCING PAD APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hose accessory device and more particularly pertains to a new hose accessory device for silencing noise of a shower hose against the wall.

(2) Description of Related Art Including Information Disclosed Under 37 CFR 1.97 and 1.98

The prior art relates to hose accessory devices designed for insulation or improved grip of various hoses. Such devices are typically not designed for shower hoses and are not intended to dampen sound from contact with walls. These devices are also typically a single segment rather than multiple, connected segments.

BRIEF SUMMARY OF THE INVENTION

An embodiment of the disclosure meets the needs presented above by generally comprising at least two segment bodies. Each segment body has a pair of outer edges and a sidewall extending therebetween. The sidewall has an inner face, an outer face, and a channel extending from the outer face through the inner face and between the pair of outer edges. Each segment body is configured to attach to a shower hose. A plurality of dampeners is coupled to the outer face of each segment body. A plurality of connector straps is coupled to the segment bodies. Each connector strap is coupled between the outer edges of adjacent segment bodies of the at least two segment bodies.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
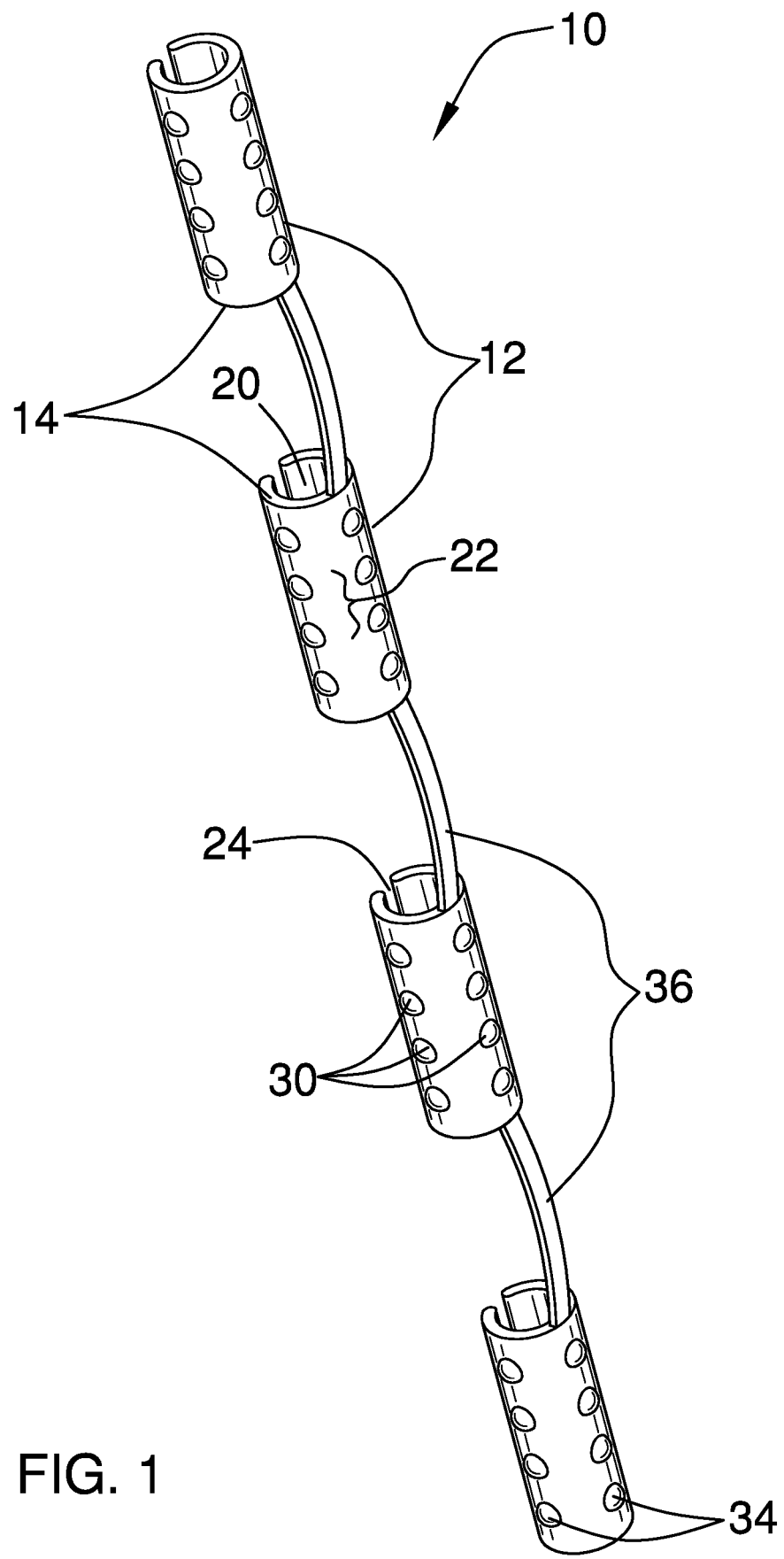
FIG. 1 is an isometric view of a shower hose silencing pad apparatus according to an embodiment of the disclosure.
Figures 2, 3:
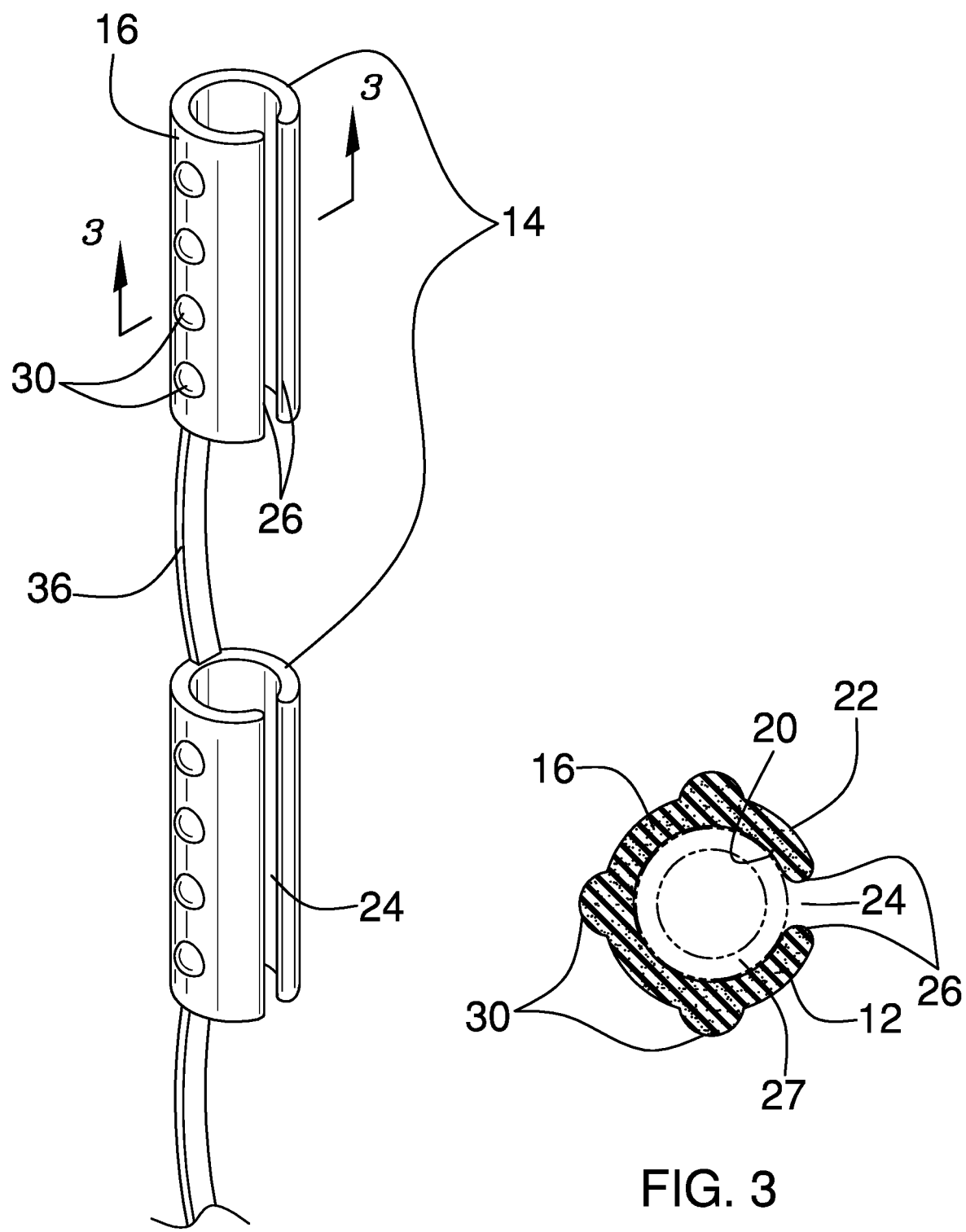
FIG. 2 is an isometric view of an embodiment of the disclosure.
FIG. 3 is a cross-sectional view of an embodiment of the disclosure along the line 3-3 of FIG. 2.
Figure 4:
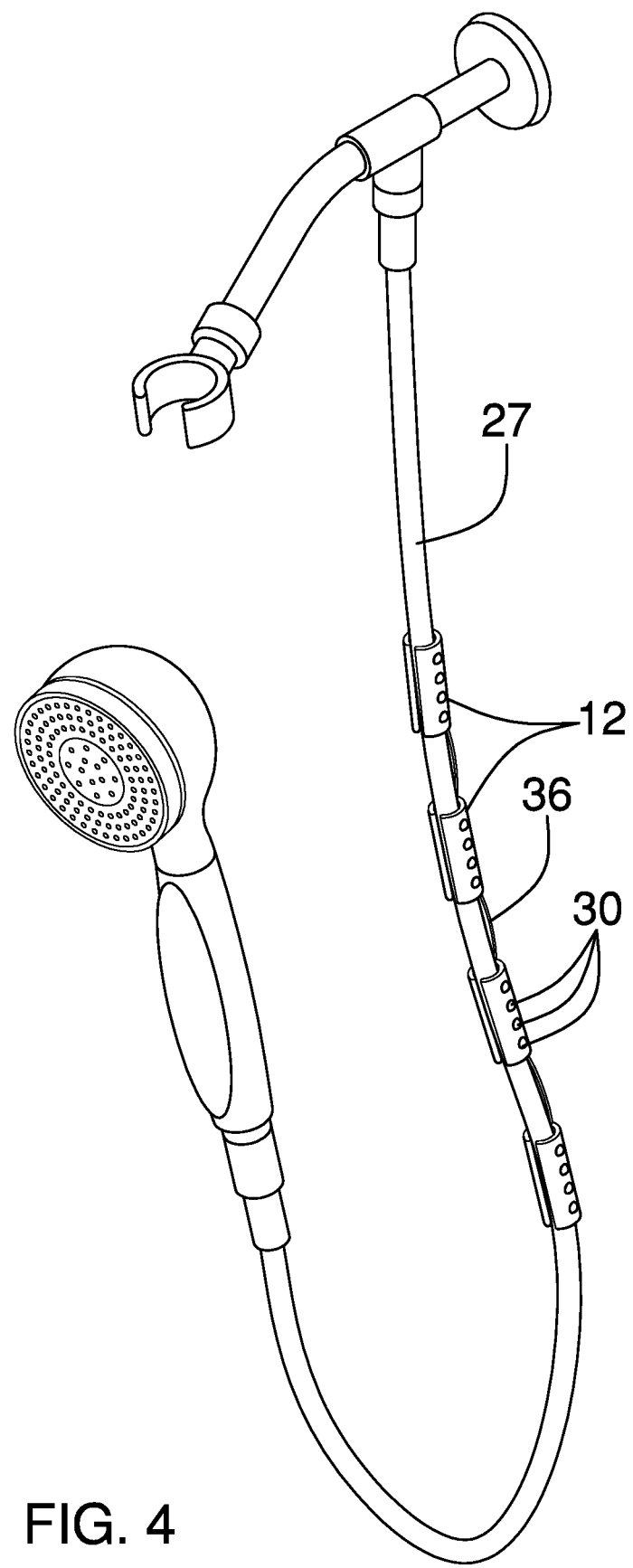
FIG. 4 is an in-use view of an embodiment of the disclosure.
Figure 5:
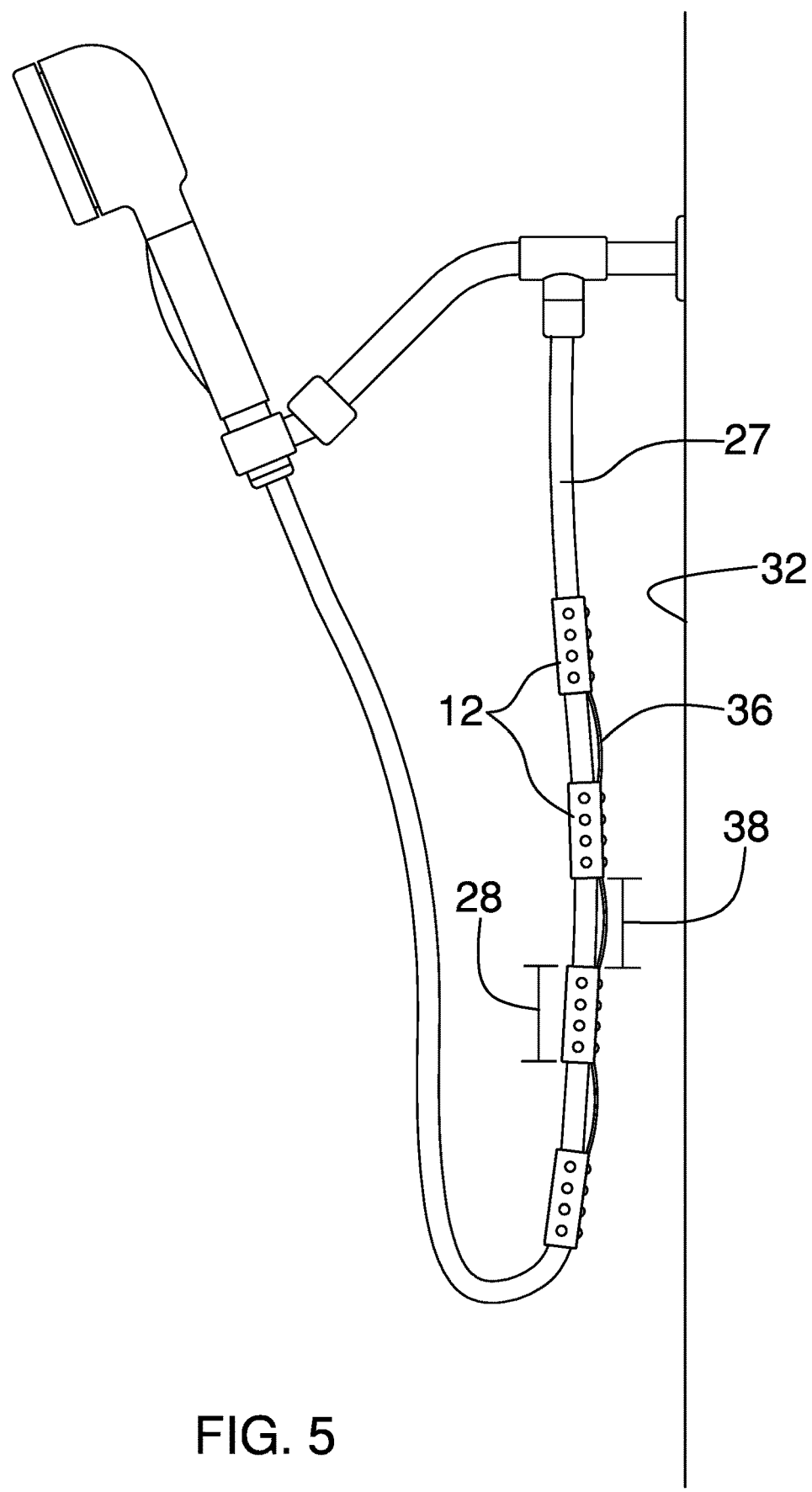
FIG. 5 is an in-use view of an embodiment of the disclosure.

With reference now to the drawings, and in particular to FIGS. 1 through 5 thereof, a new hose accessory device embodying the principles and concepts of an embodiment of the disclosure and generally designated by the reference numeral 10 will be described.

As best illustrated in FIGS. 1 through 5, the shower hose silencing pad apparatus 10 generally comprises at least two segment bodies 12. Each segment body 12 has a pair of outer edges 14 and a sidewall 16 extending therebetween and may be tubular. The sidewall 16 has an inner face 20, an outer face 22, and a channel 24 extending from the outer face 22 through the inner face 20 and between the pair of outer edges 14. A pair of inner edges 26 of the channel of each segment body may be rounded. Each segment body 12 may be padded and elastically flexible to allow the channel 24 to expand and contract, allowing each segment body 12 to be configured to attach to a shower hose 27. A segment length 28 of each segment body is sufficiently short to allow the shower hose 27 to maintain full flexibility.

A plurality of hemispherical dampeners 30 is coupled to each segment body 12. Each dampener 30 is padded and elastically depressible to be configured to minimize sound created upon impact with a shower wall 32. The plurality of dampeners 30 is coupled to the outer face 22 of each segment body and may be arranged in a set of three parallel linear arrays 34. Each array 34 may be spaced 90° apart around the outer face 22 to create an even spacing with the channel 24 oriented away from the shower wall 32. Each array 34 may comprise four dampeners 30.

A plurality of connector straps 36 is coupled to the segment bodies 12. Each connector strap 36 is coupled between the outer edges 14 of adjacent segment bodies of the at least two segment bodies 12. Each connector strap 36 is flexible. A connector length 38 of each connector strap 36 may conform to the segment length 28 of each segment body. The connector straps 36 maintain an even spacing between the segment bodies 12 and prevent the apparatus 10 from falling if one of the segment bodies 12 becomes disengaged from the shower hose 27.

In use, the apparatus 10 is attached by placing the shower hose 27 within the channel 24 of each segment body 12. The channel 24 is oriented away from the shower wall 32. As the shower hose 27 contacts the shower wall 32, the plurality of dampeners 30 absorb the impact and greatly reduce or eliminate the sound created.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A shower hose silencing pad apparatus comprising:
    at least two segment bodies, each segment body having a pair of outer edges and a sidewall extending therebetween, the sidewall having an inner face, an outer face, and a channel extending from the outer face through the inner face and between the pair of outer edges, each segment body being configured to attach to a shower hose;
    a plurality of dampeners coupled to each segment body, the plurality of dampeners being coupled to the outer face of each segment body; and
    a plurality of connector straps coupled to the segment bodies, each connector strap being coupled between the outer edges of adjacent segment bodies of the at least two segment bodies.

2. The shower hose silencing pad apparatus of claim 1 further comprising each connector strap being flexible.

3. The shower hose silencing pad apparatus of claim 1 further comprising each segment body being padded and elastically flexible to allow the channel to expand and contract.

4. The shower hose silencing pad apparatus of claim 1 further comprising each of the plurality of dampeners being hemispherical.

5. The shower hose silencing pad apparatus of claim 1 further comprising the plurality of dampeners being arranged in a plurality of linear arrays.

6. The shower hose silencing pad apparatus of claim 5 further comprising the plurality of arrays comprising three parallel arrays.

7. The shower hose silencing pad apparatus of claim 6 further comprising each array being spaced 90° apart around the outer face.

8. The shower hose silencing pad apparatus of claim 5 further comprising each array comprising four dampeners.

9. The shower hose silencing pad apparatus of claim 1 further comprising a pair of inner edges of the channel of each segment body being rounded.

10. A shower hose silencing pad apparatus comprising:
    at least two segment bodies, each segment body having a pair of outer edges and a sidewall extending therebetween, the sidewall having an inner face, an outer face, and a channel extending from the outer face through the inner face and between the pair of outer edges, a pair of inner edges of the channel of each segment body being rounded, each segment body being padded and elastically flexible to allow the channel to expand and contract, each segment body being configured to attach to a shower hose;
    a plurality of hemispherical dampeners coupled to each segment body, the plurality of dampeners being coupled to the outer face of each segment body and arranged in a set of three parallel linear arrays, each array being spaced 90° apart around the outer face, each array comprising four dampeners; and
    a plurality of connector straps coupled to the segment bodies, each connector strap being coupled between the outer edges of adjacent segment bodies of the at least two segment bodies, each connector strap being flexible.

* * * * *